(12) United States Patent
Vane et al.

(10) Patent No.: US 7,622,045 B2
(45) Date of Patent: Nov. 24, 2009

(54) HYDROPHILIC CROSS-LINKED POLYMERIC MEMBRANES AND SORBENTS

(75) Inventors: Leland Vane, Cincinnati, OH (US); Ravi Ponangi, Modesto, CA (US); Vasudevan Namboodiri, Mason, OH (US)

(73) Assignee: The United States of America as represented by the Admin. of Environmental Prot. Agcy, Washington, DC (US)

( * ) Notice: Subject to any disclaimer, the term of this patent is extended or adjusted under 35 U.S.C. 154(b) by 132 days.

(21) Appl. No.: 11/358,427

(22) Filed: Feb. 22, 2006

(65) Prior Publication Data

US 2007/0051680 A1 Mar. 8, 2007

Related U.S. Application Data

(63) Continuation-in-part of application No. 10/806,479, filed on Mar. 23, 2004, now abandoned.

(51) Int. Cl.
*B01D 11/00* (2006.01)
*B01D 63/00* (2006.01)

(52) U.S. Cl. .......... 210/640; 210/651; 210/500.37; 210/500.42; 210/502.1; 210/663; 210/263; 210/198.2; 95/45; 95/52

(58) Field of Classification Search .......... 210/502.1, 210/500.1, 500.37, 500.38, 500.42, 198.2, 210/263, 651, 500.35, 490, 640, 663; 264/41; 95/45, 52; 96/10; 428/304.4
See application file for complete search history.

(56) References Cited

U.S. PATENT DOCUMENTS

| | | | | |
|---|---|---|---|---|
| 5,039,421 A | * | 8/1991 | Linder et al. | 210/651 |
| 5,059,327 A | * | 10/1991 | Takegami | 210/500.34 |
| 5,127,925 A | * | 7/1992 | Kulprathipanja et al. | 95/54 |
| 5,271,833 A | * | 12/1993 | Funkenbusch et al. | 210/198.2 |
| 5,753,008 A | * | 5/1998 | Friesen et al. | 95/45 |
| 6,045,697 A | * | 4/2000 | Girot et al. | 210/635 |
| 6,523,699 B1 | * | 2/2003 | Akita et al. | 210/490 |
| 6,881,364 B2 | * | 4/2005 | Vane et al. | 264/41 |
| 6,946,070 B2 | * | 9/2005 | Hammen et al. | 210/198.2 |

* cited by examiner

*Primary Examiner*—Ana M Fortuna
(74) *Attorney, Agent, or Firm*—Laura Scalise; Randall Cherry; Glenna Hendricks

(57) ABSTRACT

Hydrophilic cross-linked polymeric membranes, when prepared according to the process of the present invention, are unique in character in as much as the steady state permeability of the membrane has been altered by blending and cross-linking polyalkyl amines and polyalcohols. To obtain desired results, the compositions must contain at least 10% polyalkyl amines, with preferred amounts of polyalkyl amines in the composition being in excess of 40%, with over 50% polyalkyl amine concentration by weight.

19 Claims, 1 Drawing Sheet

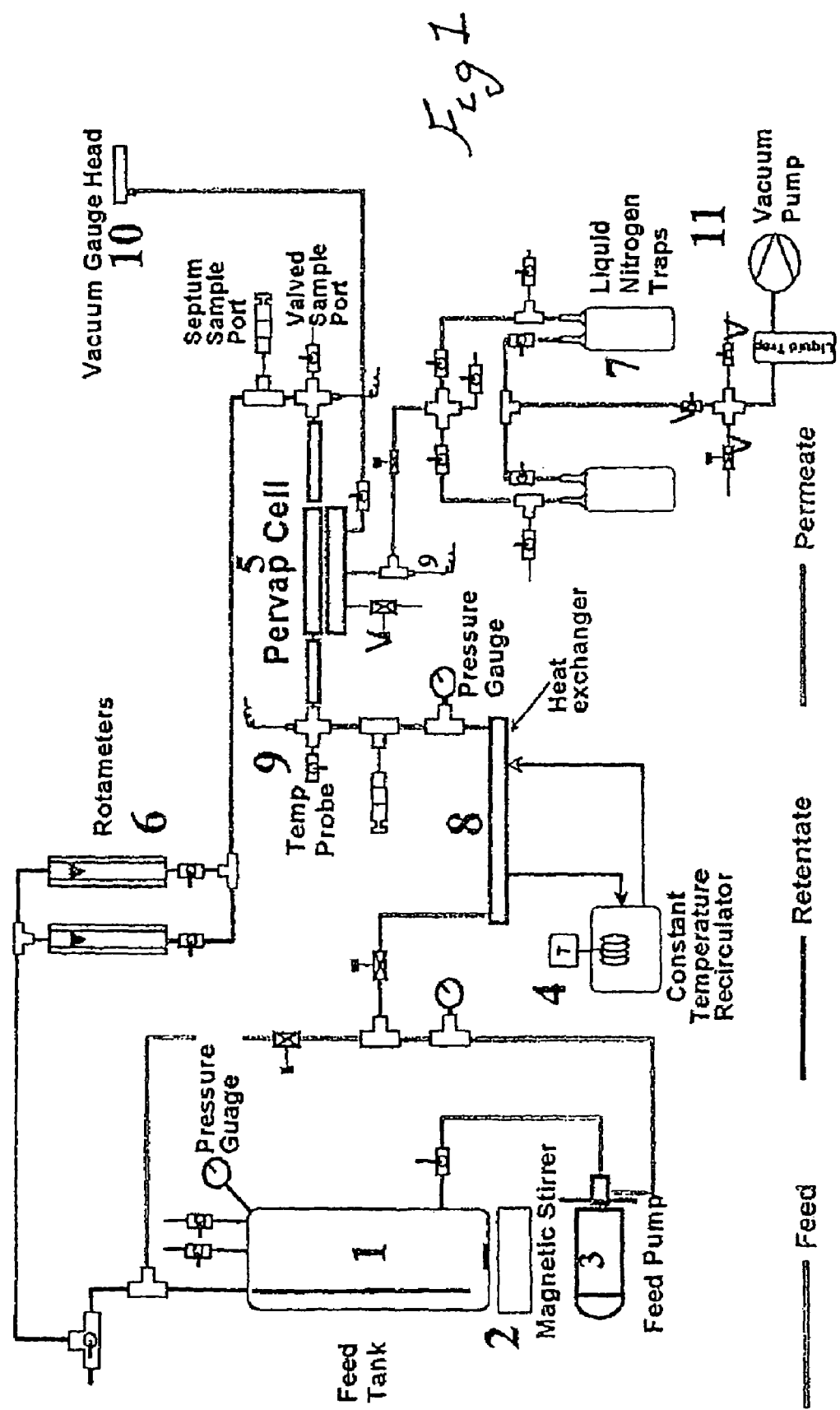

HYDROPHILIC CROSS-LINKED POLYMERIC MEMBRANES AND SORBENTS

This application is a continuation in part of U.S. patent application Ser. No. 10/806,479 filed Mar. 23, 2004, now abandoned.

FIELD AND BACKGROUND OF THE INVENTION

The present invention involves preparation of hydrophilic cross-linked polymeric materials which can be used for the fabrication of mass transfer agents such as membranes which allow selective transfer of water to or from a stream. The membranes are, for example, useful for the dehydration of organic solvent streams containing water by means of pervaporation or vapor permeation. The hydrophilic cross-linked polymeric materials described herein are comprised of two or more hydrophilic organic polymers containing at least 10% of at least one polyalkyl amine and at least one polyalcohol. These polymers are joined together using a cross-linking agent to form a cross-linked polymeric network.

Many situations require the transfer of water to or from an industrial process stream. Examples of such applications include: the drying of a gas prior to introducing that gas in a reactor to avoid undesired side reactions; the removal of water produced in a chemical reaction to drive the reaction to completion; the humidification of a gas stream to avoid drying moisture sensitive materials; and the dehydration of organic solvent streams to meet product specifications. The controlled transfer of water is carried out using hydrophilic mass transfer agents in the form of membranes or sorbent particles.

Alcohols, in particular 2-propanol (isopropyl alcohol—IPA), are being increasingly utilized in various industries as solvents and cleaning agents. Purification of alcohol streams when contaminated by water at certain concentrations becomes difficult due to the formation of azeotropic mixtures wherein the concentration of aqueous and organic components in the vapor and liquid phases are in equilibrium. Such mixtures cannot be separated by normal distillation, but only through complicated processes. Frequently, an additional substance is added to break the azeotropic mixtures. This additional substance must subsequently be completely removed and recovered from both product streams. An easy, efficient recovery and reuse of alcohols is needed to meet economic requirements and environmental regulations.

Pervaporation and vapor permeation are membrane-based unit operations in which water-free organic solvents can be produced as final product in a simple, and energy-effective manner. In pervaporation, water from a contaminated organic stream is preferentially transported across a thin membrane film. The source side of the membrane is wetted with the organic solvent/water liquid mixture, while vacuum or a sweep gas is used on the sink side of the membrane. The water is collected from the sink side by condensation. Vapor permeation is similar to pervaporation with one major difference—a vapor instead of a liquid contacts the source side of the membrane. In contrast to other membrane filtration processes, pervaporation/vapor permeation works according to a solution-diffusion mechanism. In microfiltration or ultrafiltration, for example, porosity is the key to preferential transport, and the flux rate depends upon molecular size. In pervaporation/vapor permeation, molecular interaction between membrane and separated species is the determining factor rather than the molecular size. The main component of the pervaporation/vapor permeation process is the membrane material which determines the permeation and selectivity and hence the separation properties of the process.

For pervaporation/vapor permeation to be economical and efficient, ultra-thin non-porous hydrophilic films of appropriate polymers need to be deposited onto a porous support matrix. Such a combination will provide high throughput along with good mechanical stability and will thus result in achieving the desired separation using minimum membrane area. Since water needs to be transported across the membrane, a high trans-membrane flow hydrophilic membrane must be used. The trans-membrane flow is a function of the composition of the feed. It is usually given as permeate amount per membrane area and per unit time, i.e. $kg/m^2$-h, for the better permeating component. A further essential criterion for the suitability of the pervaporation membrane is its chemical and thermal stability. To obtain a high trans-membrane flow and a sufficient driving force, it is necessary to operate the pervaporation process at the highest possible temperatures. This however means that the membrane will be in contact with a feed mixture at high temperature, which has a high concentration of organic components, for example, organic solvents. To achieve an economical lifetime of the membranes, all components of the membrane must be long durable under these aggressive conditions.

Polyvinyl alcohol (PVA) membranes are widely used in dehydration pervaporation processes. The PVA membrane shows good selectivity towards water and is considered to have excellent film-forming characteristics, with a good resistance to many organic solvents, but it has poor physical stability in aqueous mixtures. Generally, two methods of treatment are employed to improve the stability of PVA in aqueous solution: cross-linking and crystallization. The post-cross-linking procedure often involves heat treatment of the PVA solid film for a certain time. As PVA is a semi-crystalline polymer, crystallization will occur during the heat treatment as well. Crystalline regions hinder the migration of solvent molecules through the membrane due to its impermeability and its physical cross-linking effect. As a result, permeability decreases rapidly with the increase in the degree of crystallinity in a PVA membrane. Although the selectivity is more or less increased after heat treatments, the loss in permeability is generally much higher and can override the gain in selectivity in the overall performance. On the other hand, polyalkyl amines, such as polyallyl amine hydrochloride (PAA), are typically more hydrophilic than PVA. However, extremely hydrophilic polymeric materials tend to swell significantly when water is present. Such swelling results in higher fluxes through the membrane, but also results in a drastic reduction in selectivity. In this invention, cross-linked polymers of polyalkyl amines, such as PAA, with polyalcohols, such as PVA, exhibit both high fluxes and high selectivities.

U.S. Pat. No. 6,093,686, "Liquid for contact lenses", Nakada and Matano, Jul. 25, 2000 describes an aqueous solution of PAA used as preservative solution for contact lenses. U.S. Pat. No. 6,224,893, "Semi-interpenetrating or interpenetrating polymer networks for drug delivery and tissue engineering", Langer et al., May 1, 2001 describes compositions for tissue engineering and drug delivery based on a mixture of polymerizable materials including PVA and PAA. The two polymers are not cross-linked together; instead they form interpenetrating or semi-interpenetrating polymer networks. U.S. Pat. No. 6,441,089, "Water-Soluble Polymers and Compositions Thereof", Smith et al., Aug. 27, 2002 teaches chelating polymers that are water soluble, i.e. not cross-linked to create an interconnected matrix. U.S. Pat. No. 6,525,113 B1, "Process for Producing Cross-linked-Polyallylamine Hydrochloride", Klix et al., Feb. 25, 2003 teaches PAA that is was not blended with PVA to create a cross-linked polymeric material. None of the compositions and methods of the prior art used as a semi-permeable membranes for those organic processes described above. Furthermore, whereas PAA and PVA are mentioned as possible polymers in the prior art, such art does not claim specific cross-linked polymer matrices of such polymers.

U.S. Pat. No. 6,099,621, "Membranes Comprising Aminoacid Salts in Polyamine Polymers and Blends," W. S. Winston Ho, Aug. 8, 2000 teaches use of a polyamine (such as PAA) or polyamine blended with another polymer (such as PAA blended with PVA) with at least one aminoacid salt present. U.S. Pat. No. 6,099,621 requires the presence of at least one salt of an aminoacid in the range of 10 to 80 wt %, whereas the present invention does not require an aminoacid salt. In fact, the aminoacid salt might be detrimental to the objective for which the present invention is useful. The composition of U.S. Pat. No. 6,099,621 is not used as a semi-permeable dehydrating material or as water sorbing gel.

Patent application Ser. No. 10/145,838 of Vane, et al. teaches use of PVA with minimal amounts of PAA cross-linked in a composition containing silicon dioxide. However, at the low levels of polyalkyl amines disclosed therein, the membranes are quite inferior to those described herein.

BRIEF DESCRIPTION OF THE DRAWING

FIG. 1 shows an apparatus used in preparation of the constructs of the invention.

SUMMARY OF THE INVENTION

Hydrophilic cross-linked polymeric membranes, when prepared according to the process of the present invention, are unique in character in as much as the steady state permeability of the membrane has been altered by blending and cross-linking polyalkyl amines and polyalcohols. To obtain desired results, the compositions must contain at least 10% polyalkyl amines, with preferred amounts of polyalkyl amines in the composition being in excess of 40%, with over 50% polyalkyl amine concentration by weight being most preferred. The specific combination of ingredients making up a hydrophilic cross-linked polymeric membranes of the invention as used and taught herein were not previously known. The cross-linked polymeric membranes contain at least two or more hydrophilic polymers which are cross-linked using either an acid or an aldehyde cross-linking agent(s). At least one of the polymers is a polyalkyl amine and at least one polymer is a polyalcohol. In a preferred embodiment of the invention, polyalkyl amines are chosen from polyallyl amine, polyvinyl amine, poly-4-vinyl pyridine and poly-2-vinyl pyridine. A single species or a combination containing more than one polyamine may be used in the practice of the invention. The more commonly used polyalcohols for practice of the invention are polyvinyl alcohol, polyethylene glycol, and polyallyl alcohols. Silicon dioxide nanoparticles can be added to the formulation to alter final properties including tensile modulus and elongation.

DETAILED DESCRIPTION OF THE INVENTION

This invention provides membranes having unique properties for use in separation of aqueous/organic mixtures. The membranes of the invention are exemplified herein using specific species of polyalkyl amines and poly alcohols. However, the invention may be practiced using a wide range of such amines and alcohols to provide beneficial properties disclosed herein. The polymers produced have backbone repeat units containing 2 carbon atoms with pendent amino and OH groups, an acid moiety and, in many cases, pendent carbon chains with an acid moiety in the final product. Homopolymers produced from the alcohols and amines below were used to create the membranes of the invention which are produced from alcohols, glycols and mines using, as starting materials, preferred alcohols have from 2-8 carbons per each unit. Preferred amines are acid salts of amines having 2-8 carbon atoms per each double bond. The invention is exemplified utilizing polyallyl amine hydrochloride (PAA) and polyvinyl alcohol (PVA) as the two hydrophilic polymers and glutaraldehyde as cross-linking agent. The hydrophilic polymeric membranes are fabricated into either homogenous or composite type structures to provide a cross-linked layer that is clear (without any phase separation). As an example, homopolymers used are prepared from alcohols of the formula:

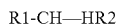

R1-CH—HR2 wherein—may be either a double or single bond, R1 is an OH group or a hydrocarbon chain of 2-4 carbons terminating in an OH group and R2 is a hydrogen or a chain or cyclic hydrocarbon moiety. For example, for vinyl alcohol, R1 is HO and R2 is H. The acid amines are of the formula:

R3-CH—CHR4

Wherein—may be a single or double bond, R3 is an acid amine group containing no carbon atoms, a hydrocarbon chain terminating in an acid amine group, or a ring moiety containing an acid amine group and R4 is a hydrogen or a hydrocarbon chain or cyclic hydrocarbon moiety with the carbon attached to R3. For example, for allyl alcohol R1 would be HO—$CH_2$ and R2 is H. For example, for alklylamine HCl, R3 would be (HCl)$NH_2$—$CH_2$ and R4 is H, for vinyl amine HCl, R3 would be (HCl)$NH_2$ and R4 would be H.

Additionally, starting materials of the homopolymers of an alcohol may be produced from alcohols of the formula:

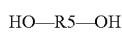

HO—R5—OH wherein R5 is a saturated or unsaturated hydrocarbon chain of from 2 to 4 carbon atoms.

An example is ethylene glycol in which R5 is CH2-CH2. The resulting polymer, polyethylene glycol is: H—(O—CH2-CH2)n-OH where "n" is the number of ethylene glycol molecules reacted linked to form the polymer.

The separation efficiencies of different membranes made from the compositions described herein were evaluated by comparing two values—flux and selectivity; these two values were evaluated using a varying number of experimental conditions (feed temperature, water concentration in feed, and solvent type). Membranes produced from the compositions described herein display a surprising and unexpected increase in water flux and water selectivity properties of that membrane for a given fluid mixture.

Without being bound or limited by any scientific theory, it is believed that the difference in water flux and water selectivity is due to the alteration in steady state permeability which has been imparted to the hydrophilic polymeric materials that are the subject of the invention. Such polymeric compositions have superior steady state permeability over pure, i.e. non blended polymers. As an example of its usefulness, water and IPA may be separated because of the marked differences in their respective permeabilities through the hydrophilic cross-linked polymer.

In contrast to the art disclosed in prior patents and articles which have been heretofore discussed, the present discovery describes a novel and highly advantageous method of preparing a hydrophilic cross-linked polymeric materials as well as uses for the material as a mass transfer agent, in particular, as pervaporation membranes. Although it is reported in literature that PVA and PAA can co-exist together at certain conditions, there were no attempts to modify these materials for use as hydrophilic membranes. The present invention provides means for combining polyalkyl amines with polyalcohols to produce a material that is homogenous, strong, and clear without any phase separation between organic polymers. Additionally, the present invention provides a method for fabricating thin film membranes from the compositions disclosed herein as material for transferring water to and/or from process streams. Such streams could contain, for example, air, nitrogen, oxygen, methane, ethane, ethyl alcohol, methyl alcohol, isopropyl alcohol, n-propanol, acetone, tetrahydrofuran, n-butanol, tert-butanol, sec-butanol, dimethylformamide, acetic acid, and mixtures thereof. The membranes of the invention can also be used to remove water from condensation reaction systems (such as esterification reaction systems), thereby improving reaction kinetics and shifting the reaction in favor of the reaction products.

Materials

The cross-linked polymeric materials were fabricated using commercially available chemicals. All the chemicals listed below are available from a variety of sources under different names and any use of such materials will also result in the cross-linked polymeric-materials having the desirable properties described herein. Poly(vinyl alcohol) (PVA), 99 mol % hydrolyzed, was purchased from Polysciences, Inc, PA, USA. Poly(allylamine hydrochloride), glutaric dialdehyde (glutaraldehyde)-50 wt % solution in water, and maleic acid 99% were purchased from Aldrich Chemical Co., USA. Samples of poly(allylamine hydrochloride) were also purchased from Polysciences, Inc, PA, USA.

Pervaporation Studies

A pervaporation bench-scale unit according to the present invention is shown in FIG. 1. The feed tank (1) was a 20 liter stainless steel ASME pressure vessel. The feed consisting of organic solvent and water mixture, varying in water concentration from 5-50 wt %, is made up in the feed tank by adding predetermined amounts of the organic solvent and water. The feed mixture was circulated between the feed tank (1), which contained a magnetic stirrer (2), and the pervaporation cell (5) in a closed loop using a gear type liquid pump (3). Liquid flow rate was measured with a rotameter (6). The temperature of the feed liquid was held constant by passing the feed through the inner tube of a tube-in-tube heat exchanger (8). The temperature of the shell fluid was controlled via a thermostated recirculating bath (4). The feed liquid temperature and the permeate vapor temperature A stainless steel membrane filtration cell fabricated in-house with an effective membrane area of 40.0 cm$^2$ was used in cross-flow mode. The membrane was supported by a fritted stainless steel support. The cell was sealed by Viton O-rings. The feed entered the cell at one end of the upper compartment, flowed along the length of the membrane, and exited the cell at the opposite end of the upper compartment. The feed circulation across the test cell was 1500 ml/min of organic solvent/Water mixture. Separation experiments were conducted at temperatures of 30, 40, 50, 60, 70 and 80° C.

Two feed samples were taken for each run, one at the beginning and another at the end of the run. The reported feed concentration was the average concentration of these two samples. One permeate sample was acquired during each run. The cold trap was first weighed after warming to room temperature, and then the permeate sample was dissolved in 20-30 ml of methanol or water. All feed samples and some permeate samples required dilution in methanol or water in order to fall within the analytical calibration range. All diluted samples were transferred immediately to 20 mL vials capped with Teflon-lined septa.

The composition of both feed and permeate were analyzed by direct injection gas chromatography (GC) using HP 6890 series GC equipped with a flame ionization detector. In general, the analysis protocol detailed in EPA test method 601 was followed with the following modifications: (1) flame ionization detector, (2) Analysis for IPA is conducted by GC equipped with a FID detector, using direct injection. Fluorobenzene and 2-butanol are used as the internal standard and surrogate, respectively and (3) HP-624 60 m×0.32 mm ID capillary column, 1.8 mm film thickness.

Cross-linked Polymeric Materials

The cross-linked polymeric membranes described herein comprise two or more hydrophilic organic polymeric materials cross-linked together. At least one polymer is a polyalkyl amine. In preferred methods of the invention, the polyalkyl amine is chosen from the group of polyallyl amine, polyvinyl amine, poly-4-vinyl pyridine and poly-2-vinyl pyridine. The polyalkyl amine polymers may be used in ionic derivative forms as, for example, chlorides, sulfates or nitrates. The preferred polyalcohol for production of polymers may be selected from polyvinyl alcohol, polyethylene glycol and polyallyl alcohol. The cross-linking agent(s) may be aldehydes or acids, such as maleic acid or glutaraldehyde. SNOWTEX-O, 40 and UP from Nissan Chemical Industries, Ltd, USA. SNOWTEX-O is a clear aqueous colloidal silica sol having a pH 2-4 and containing 21.5 wt % nano-sized particles (10-20 nm) of silicon dioxide dispersed in water.

The polyalkyl amine and polyalcohol polymers are such that multiple polymers from each class of polymer can be combined to yield a product with the desirable properties. In this manner, the polyalkyl amine portion of the formulation of the cross-linked polymeric material may consist of one polyalkyl amine polymer or of a blend of up to all four claimed polyalkyl amine polymers. Likewise, the polyalcohol portion of the formulation may consist of one polyalcohol polymer or of a blend of up to all three claimed polyalcohol polymers. For example, the composition detailed in Example 1 consists of 60 wt % poly(allyl amine hydrochloride), 35 wt % polyvinyl alcohol, and 5 wt % glutaraldehyde. A polymer in which 50% of the poly(allyl amine hydrochloride) is replaced by poly(vinyl amine hydrochloride) or in which 50% of the polyvinyl alcohol is replaced by polyallyl alcohol (or both) would have desirable hydrophilic properties.

The cross-linked polymeric membrane prepared according to the process described herein will possess the ability to effect the separation of various components of fluids, particularly water, from alcohols present in a feed mixture, by utilizing the differences in the steady state permeability characteristic of each component of the mixture.

Although this invention has been demonstrated using homogeneous, unsupported films, the membranes may be composite membranes comprising a dense nonporous layer consisting of the cross-linked polymeric material on a support material, the dense nonporous layer being applied to the support material by methods commonly known to those skilled in the art of membrane fabrication such as solution casting followed by cross-linking. The support material used is advantageously a porous support material, preferably an asymmetrical porous support material, i.e. a porous support material which has pores of different average diameters on the front and the back. Suitable supports may be based on materials having hydrophilic characteristics. One such porous support material used commercially is a composite reverse osmosis membrane. Products acceptable for use as supports may be purchased from many suppliers. One such provider is GE Osmonics of Minnetonka, Minn.

Homogeneous films of the materials were created by casting an aqueous solution of the polymers and cross-linking agent onto a Teflon-coated plate. Water was allowed to evaporate at room temperature. The film was then cured in an air oven at 150° C. for at least one minute with times of 2 hours being used sometimes.

EXAMPLE 1

Preparation of High PAA Content Membranes

A procedure for the preparation of a PAA-PVA membrane containing a high PAA membrane used a 60 wt % PAA, 35 wt % PVA and 5% glutaraldehyde membrane. PVA (0.7 g) was added to deionized water (15 mL), followed by heating of the mixture in a closed container in an air oven at 90 to 100° C. for 6 to 8 hours and the resulting clear solution cooled to room temperature. Polyallyl amine hydrochloride (PAA-HCl) (1.2 g) was dissolved in water (10 mL) aided by sonication with a probe sonicator for 2 minutes. The PAA solution was then added to the PVA solution and sonicated for 1 minute to obtain a uniform solution. Glutaraldehyde (0.2 g of a 50/50 wt solution in water, thus 0.1 g glutaraldehye) was added to the PAA-PVA-water solution and sonicated for 1 minute. The solution was poured into a 5.5 inch×9 inch mold with a Teflon sheet as the bottom of the mold and allowed to dry overnight at room temperature. The resulting film was then peeled from the Teflon mold and heated in an air oven at 150° C. for 2 hours to create a cross-linked polymer. The thickness of the resulting membrane was circa 60 microns.

EXAMPLE 2

Pervaporation Performance of High PAA Content Membrane with Isopropyl Alcohol-water Solutions as Function of Feed Temperature Membrane prepared according to procedure detailed in Example 1 was tested in pervaporation mode with isopropyl alcohol (IPA)-water feed solutions. The solution contained 86±1 wt % IPA, the balance water. Performance is shown in Table 2-1. For example, at a feed temperature of 70° C., the total flux through the membrane was 3.14 kg/m² hr with a water/IPA selectivity of 2930. The permeate contained greater than 99 wt % water while the feed contained 14±1 wt % water. The last column in Table 2-1 lists the thickness-normalized water flux which is the estimated flux of water through a membrane which is 1 micron thick. The flux of water through a membrane which is "n" microns thick can be estimated by dividing the thickness-normalized water flux by "n".

TABLE 2-1

Performance of 60 wt % PAA/35 wt % PVA membrane with 86 wt % IPA—14 wt % water (±1 wt %) solution as Function of Temperature

| Pervaporation Feed Temperature (° C.) | Total Flux (kg/m²h) | Water/IPA Selectivity (α) | Thickness-Normalized Water Flux (μm kg/m²hr) |
|---|---|---|---|
| 23 | 0.61 | 1,640 | 37 |
| 50 | 1.82 | 2,810 | 109 |
| 60 | 2.46 | 3,230 | 148 |
| 70 | 3.14 | 2,930 | 188 |

EXAMPLE 3

Pervaporation Performance of High PAA Content Membrane with Ethanol-water Solutions as Function of Water Content Membrane prepared according to procedure detailed in Example 1 was tested in pervaporation mode with feed solutions consisting of aqueous ethanol solutions at 70° C. Performance is shown in Table 3-1. For example, when the feed solution contained 6 wt % water, a total flux of 0.47 kg/m²hr and water/ethanol selectivity of 3,950 were obtained.

TABLE 3-1

Performance of 60 wt % PAA/35 wt % PVA membrane with ethanol/water solutions at 70° C.

| Water Content of Feed (wt %) | Total Flux (kg/m²h) | Selectivity (α) | Thickness-Normalized Water Flux (μm kg/m²hr) |
|---|---|---|---|
| 6 | 0.466 | 3,950 | 28 |
| 10 | 1.20 | 1,030 | 72 |
| 15 | 2.04 | 450 | 121 |
| 20 | 2.81 | 170 | 165 |

EXAMPLE 4

Pervaporation Performance of High PAA Content Membrane with Binary Solutions of Water and Either Methanol or Acetone Membrane prepared according to example Example 1 was tested in pervaporation mode with feed solutions consisting of water and either methanol or acetone. Acetone dehydration performance is shown in Table 4-1 while methanol dehydration performance is shown in Table 4-2. For example, when the feed solution contained 6.2 wt % water/93.8 wt % acetone, a total flux of 0.196 kg/m²hr and water/acetone selectivity of 17,600 were obtained. The separation of water from methanol is quite challenging. The membrane described in Example 1 delivered a water-methanol separation factor ranging from 13 to 25 which is high for this mixture.

TABLE 4-1

Performance of 60 wt % PAA/35 wt % PVA membrane with acetone-water solutions at 50° C.

| Water Content of Feed (wt %) | Total Flux (kg/m²h) | Selectivity (α) | Thickness-Normalized Water Flux (μm kg/m²hr) |
|---|---|---|---|
| 6.2 | 0.196 | 17,600 | 11.8 |
| 9.3 | 1.03 | 4,890 | 61.7 |
| 14 | 1.79 | 2,270 | 108 |

TABLE 4-2

Performance of 60 wt % PAA/35 wt % PVA membrane with methanol-water solutions at a several of temperatures and water concentrations.

| Water Content of Feed (wt %) | Temperature (° C.) | Total Flux (kg/m²h) | Selectivity (α) | Thickness-Normalized Water Flux (μm kg/m²hr) |
|---|---|---|---|---|
| 4 | 60 | 0.277 | 21 | 7.76 |
|   | 50 | 0.174 | 25 | 5.33 |
| 10 | 70 | 0.927 | 13 | 32.9 |
|   | 60 | 0.727 | 13 | 25.8 |
| 13.5 | 60 | 0.988 | 23 | 46.4 |
|   | 50 | 0.693 | 24 | 32.8 |

EXAMPLE 5

Pervaporation Performance of PAA-PVA Membranes for Dehydration of Isopropyl Alcohol as a as Function of PAA Content of Membrane Membranes were prepared generally following procedure of Example 1, although with variable amounts of polyallyl amine-hydrochloride (PAA-HCl) and PVA. Glutaraldehyde present at 5 wt % in all membranes. All membranes were cross-linked for 2 hours at 150° C. Membranes tested in pervaporation mode with feed solutions consisting of aqueous IPA solutions at 70° C. Performance are shown in Table 5-1. For example, when the membrane contained 80 wt % PAA-HCl, 15 wt % PVA, and 5 wt % glutaraldehyde, a total flux of 4.84 kg/m²hr and water/IPA selectivity of 1,910 were obtained.

TABLE 5-1

Performance of PAA-PVA polymeric membrane with IPA/water solutions at 70° C.. Feed contained 14 wt % water, the balance IPA. Membrane thickness approximately 60 microns.

| PAA-HCl Content of Membrane (wt %) | Total Flux (kg/m²h) | water/IPA Selectivity (α) | Thickness-Normalized Water Flux (μm kg/m²hr) |
|---|---|---|---|
| 15 | 0.554 | 2,130 | 33 |
| 40 | 1.77 | 5,070 | 106 |
| 60 | 3.14 | 2,930 | 188 |
| 80 | 4.84 | 1,910 | 290 |

EXAMPLE 6

Enhancement of Physical Properties of Cross-inked PAA-PVA Membranes by Addition of Nanoscale Silicon Dioxide Particles Films were prepared generally following procedure of Example 1, although with variable amounts of polyallyl amine-hydrochloride (PAA-HCl), PVA, and, additionally, incorporating silicon dioxide nanoparticles (SNOWTEX-O aqueous colloidal silica sol). Glutaraldehyde is present at 5 wt % in all membranes. All membranes are cross-linked for 2 hours at 150° C. Final film thickness is circa 200 micrometers. Films were tested according to ASTM Method D882-02. Individual films were destructively tested at 23° C. after equilibration under a variety of conditions including at 23° C. in air at 100% relative humidity with immersion in 95/5 IPA/water mixture (by weight); immersion in 85/15 IPA/water mixture (by weight); and immersion in 50/50 IPA/water mixture (by weight). The observed tensile modulus for tests on two formulations—one with and one without particles—are presented in Table 6-1 as the average and standard deviations from five (5) replicates for each film and test conditions. The ratio of PAA to PVA was the same for both films. Under all equilibration conditions, the addition of the silicon dioxide particles resulted in an increase in the tensile modulus indicating that the formulation containing nanoparticles was stronger than the formulation without nanoparticles.

TABLE 6-1

Tensile modulus of PAA-PVA polymeric films with and without addition of silicon dioxide nanoparticles under four test conditions. Films were approximately 200 μm thick. All tests performed at 23° C.

|  | Formulation "EPA3" | Formulation "EPA4" |
|---|---|---|
| Poly(allylamine hydrochloride) content in film (wt %) | 20 | 17 |
| Polyvinyl alcohol content (wt %) | 75 | 63 |
| Silicon Dioxide content (wt %) | 0 | 15 |
| Glutaraldehyde content (wt %) | 5 | 5 |
| Tensile Modulus after equilibration in 100% relative humidity air @ 23° C. (psi) | 15,000 ± 1,500 | 27,200 ± 5,910 |
| Tensile Modulus after equilibration in 95/5 mixture (by wt) IPA/water solution (psi) | 51,600 ± 12,900 | 153,000 ± 27,000 |
| Tensile Modulus after equilibration in 85/15 mixture (by wt) IPA/water solution (psi) | 6,430 ± 1,370 | 17,300 ± 2,460 |
| Tensile Modulus after equilibration in 50/50 mixture (by wt) IPA/water solution (psi) | 2,900 ± 343 | 5,500 ± 469 |

EXAMPLE 7

Preparation of Hydrophilic Cross-linked Polymeric Membrane Containing Multiple Polyalkyl Amines Preparation of cross-linked hydrophilic polymeric membrane containing multiple polyalkyl amines is,as follows: (details provided for a 50 wt % polyallyl amine (PAA), 10 wt % polyvinyl amine (PVAm), 35 wt % polyvinyl alcohol (PVA), and 5% glutaraldehyde membrane). To PVA (0.7 g) is added deionized water (15 mL), followed by heating of the mixture in a closed container in an air oven at 90 to 100° C. for 6 to 8 hours and the resulting clear solution cooled to room temperature. Polyallyl amine hydrochloride (1.0 g) and polyvinyl amine hydrochloride (0.2 g) are dissolved in water (10 mL) aided by sonication with a probe sonicator for 2 minutes. The mixed polyalkyl amine solution is then added to the PVA solution and sonicated for 1 minute to obtain a uniform solution. Glutaraldehyde (0.2 g of a 50/50 wt solution in water, thus 0.1 g glutaraldehye) is added to the PAA-PVAm-PVA-water solution and sonicated for 1 minute. The solution is poured into a 5.5 inch×9 inch mold with a Teflon sheet as the bottom of the mold and allowed to dry overnight at room temperature. The resulting film is then peeled from the Teflon mold and heated in an air oven at 150° C. for 2 hours to create a cross-linked polymer. The thickness of the resulting membrane is circa 60 microns.

EXAMPLE 8

Preparation of Hydrophilic Cross-linked Polymeric Membrane Containing Multiple Polyalcohols Preparation of cross-linked hydrophilic polymeric membrane containing multiple polyalcohols is as follows (details provided for a 60 wt % polyallyl amine (PAA), 10 wt % polyallyl alcohol (PAOH), 25 wt % polyvinyl alcohol (PVA), and 5% glutaraldehyde membrane): Polyvinyl alcohol (0.5 g) and polyallyl alcohol (0.2 g) are added to deionized water (15 mL), followed by heating of the mixture in a closed container in an air oven at 90 to 100° C. for 6 to 8 hours and the resulting clear solution cooled to room temperature. Polyallyl amine hydrochloride (1.2 g) is dissolved in water (10 mL) aided by sonication with a probe sonicator for 2 minutes. The PAA-water solution is then added to the mixed PVA/PAOH solution and sonicated for 1 minute to obtain a uniform solution. Glutaraldehyde (0.2 g of a 50/50 wt solution in water, thus 0.1 g glutaraldehye) is added to the PAA-PVA-PAOH-water solution and sonicated for 1 minute. The solution is poured into a 5.5 inch×9 inch mold with a Teflon sheet as the bottom of the mold and allowed to dry overnight at room temperature. The resulting film is then peeled from the Teflon mold and heated in an air oven at 150° C. for 2 hours to create a cross-linked polymer. The thickness of the resulting membrane is circa 60 microns.

EXAMPLE 9

Preparation of Hydrophilic Cross-linked Polymeric Membrane Containing Multiple Polyalkyl Amines and Polyalcohols Preparation of cross-linked hydrophilic polymeric membrane containing multiple polyalkyl amines and multiple polyalcohols is as follows (details provided for a 50 wt % polyallyl amine (PAA), 10 wt % polyvinyl amine (PVAm), 10 wt % polyallyl alcohol (PAOH), 25 wt % polyvinyl alcohol (PVA), and 5% glutaraldehyde membrane): Polyvinyl alcohol (0.5 g) and polyallyl alcohol (0.2 g) are added to deionized water (15 mL), followed by heating of the mixture in a closed container in an air oven at 90 to 100° C. for 6 to 8 hours and the resulting clear solution cooled to room temperature. Polyallyl amine hydrochloride (1.0 g) and polyvinyl amine hydrochloride (0.2 g) are dissolved in water (10 mL) aided by sonication with a probe sonicator for 2 minutes. The mixed polyalkyl amine solution is then added to the mixed PVA/PAOH solution and sonicated for 1 minute to obtain a uniform solution. Glutaraldehyde (0.2 g of a 50/50 wt solution in water, thus 0.1 g glutaraldehye) is added to the PAA-PVAm-PVA-PAOH-water solution and sonicated for 1 minute. The solution is poured into a 5.5 inch×9 inch mold with a Teflon sheet as the bottom of the mold and allowed to dry overnight at room temperature. The resulting film is then peeled from the Teflon mold and heated in an air oven at 150° C. for 2 hours to create a cross-linked polymer. The thickness of the resulting membrane is circa 60 microns.

EXAMPLE 10

Preparation of Hydrophilic Cross-linked Polymeric Sorbent Particles

Preparation of cross-linked hydrophilic polymeric sorbent particles follows the general procedure of Example 1. However, after peeling PAA-PVA-glutaraldehyde film from Teflon mold, the film is cut into small pieces before curing in an air oven at 150° C. for 2 hours.

The sorbent particles may be used in packed columns through which the stream of vapor or liquid is passed. The particles may also be placed into the organic/water containing liquid or vapor to remove water from the solution. The particles are then removed from the liquid.

What we claim is:

1. A polymeric composition in the form of a membrane or sorbent particles which contains (1) at least 40% of at least one homopolymer made from an alkyl amine and (2) one homopolymer produced from an alcohol of the formula:

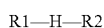

R1—H—R2 wherein — is either a double or single bond, R1 is an OH group or a hydrocarbon chain of 2-4 carbon terminating in an OH group, and R2 is a hydrogen or a hydrocarbon chain or cyclic hydrocarbon moiety; or from a glycol of the formula:

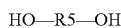

HO—R5—OH wherein R5 is a saturated or unsaturated hydrocarbon chain of from 2 to 4 carbon atoms and the polyamine is produced from one amine of the formula:

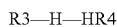

R3—H—HR4 wherein — is a single or double bond, R3 is an acid amine group containing no carbon atoms, a hydrocarbon chain terminating in an acid amine group, or a ring moiety containing an acid amine group, and R4 is a hydrogen or a hydrocarbon chain or cyclic hydrocarbon moiety with the carbon attached to R3.

2. The composition of claim 1 which is in the form of a membrane.

3. The membrane of claim 2 wherein the polyalkyl amine is chosen from among polyallyl amine, polyvinyl amine, poly-4-vinyl pyridine and poly-2-vinyl pyridine.

4. The membrane of claim 2 wherein the polyalcohol is chosen from among polyvinyl alcohol, polyethylene glycol and polyallyl alcohol.

5. The membrane of claim 2 wherein the polyalkyl amine is an ionic derivative of the amine.

6. The membrane of claim 5 wherein the ionic group is a chloride, sulfate or nitrate.

7. The membrane of claim 2 which is a selectively permeable membrane.

8. The membrane of claim 2 which is on a porous support.

9. The membrane of claim 2 containing, additionally, silicon dioxide particles.

10. A process for removing water from a process stream using the membrane of claim 2 comprising contacting said stream with said membrane, said stream containing an organic component.

11. The process of claim 10 wherein the process stream is a vapor.

12. The process of claim 10 wherein the process stream is a liquid.

13. The composition of claim 1 which is in the form of sorbent particles.

14. A process of removing water from a stream containing an organic/water mixture by exposure of said mixture to the sorbent particles of claim 13.

15. A process of removing water from a stream containing an organic/water mixture comprising the steps of: a: loading a column with the particles of claim 13, and b: passing said stream containing an organic/water mixture through said column.

16. The process of claim 15 wherein said stream is a liquid.

17. The process of claim 15 wherein said stream is a vapor.

18. The method of claim 1 wherein the polyalkyl amine is present at a 50% to 90% concentration by weight.

19. The composition of claim 18 further containing sorbent particles.

* * * * *